Oct. 13, 1931.  F. J. KUBLER  1,827,395
VEHICLE BODY CONSTRUCTION
Filed Oct. 17, 1929
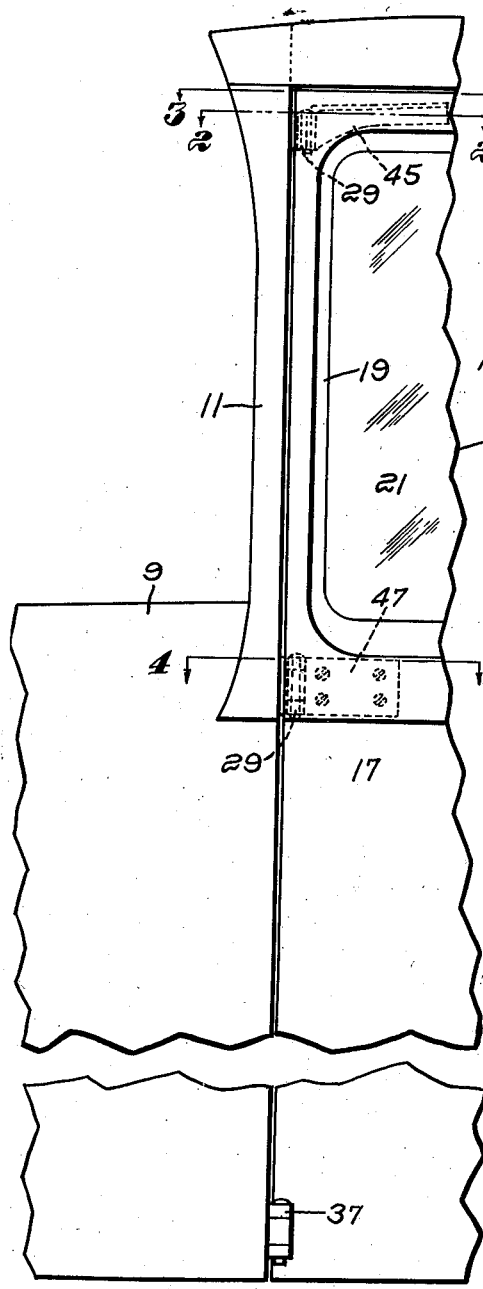
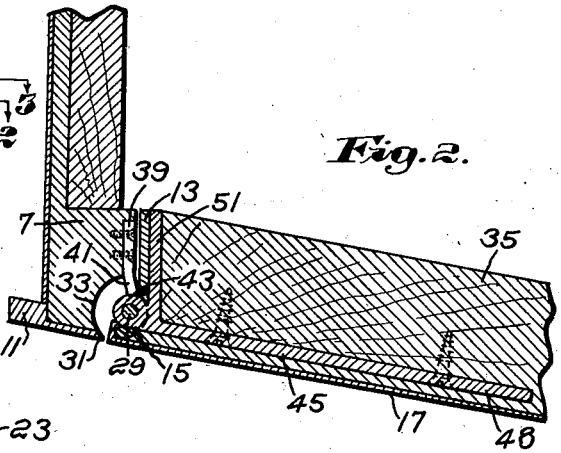
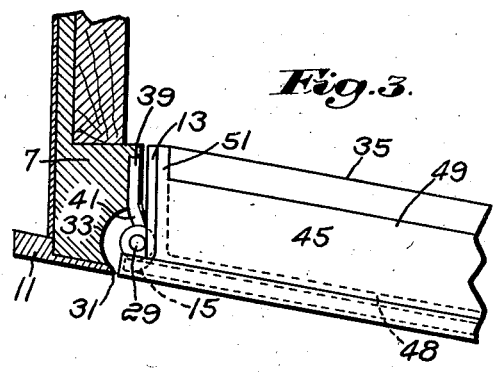
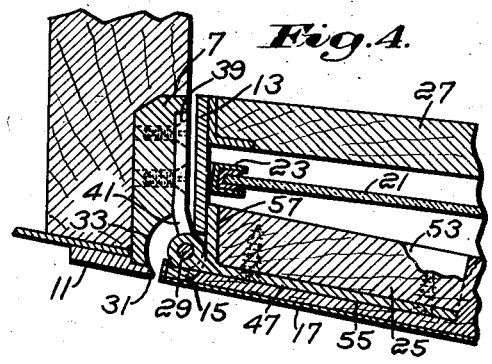
Inventor:
Frederick J. Kubler,
by Emery, Booth, Janney & Townsend
Attys Patented Oct. 13, 1931

1,827,395

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

VEHICLE BODY CONSTRUCTION

Application filed October 17, 1929. Serial No. 400,234.

This invention relates to the body construction of vehicles, and more particularly to the doors thereof and the hanging of the same. The object is to provide an improved construction having various advantages, some of which will appear as the description proceeds, more particularly in a vehicle wherein the dimensions of the cooperating pillars are relatively restricted and/or in which the region above the turn-under of the vehicle, is concealed.

My invention will be well understood by reference to the following description of an illustrative embodiment thereof shown by way of example in the accompanying drawings wherein:—

Fig. 1 is a broken side elevation of the forward corner of a closed automobile body; and Figs. 2, 3 and 4 are sections on the correspondingly numbered lines of Fig. 1 on a larger scale.

While not limited thereto, my invention finds a particular application to the forward corner of vehicles in which the cowl pillar forms the body hinge pillar for the forward door and wherein above the belt line it, together with the adjacent door hinge pillar and the windshield frame, if present, constitutes an assembly of restricted dimension to facilitate the driver's vision, especially where this assembly is organized to present an obstruction less in width than the distance between the eyes, as described in the patent to Emond No. 1,622,098, dated March 22, 1927. In a structure of this kind I provide for utilizing hinge members of ample size in spite of the necessary small dimensions of the pillars and preferably hinge members which are concealed.

In the embodiment of the invention shown by way of example the door is hung on a body pillar comprising a supporting member 7 incorporated with the framework of the vehicle below the belt and arising adjacent the cowl 9, the exterior contour of the pillar in the present instance being completed by a detachably secured die casting 11. The door hinge pillar or stile cooperating therewith is here shown as formed of sheet metal and has a portion 13 of web section consisting of substantially a single thickness of the sheet metal disposed in the plane of the jamb of the door and cooperating with the opposed surface of the body pillar 7 to form a door joint. This web member 13 is at the exterior flanged outwardly at 15 to provide an overlap flange about which is clinched the edge of the exterior sheet metal panel 17, a portion of which in the upper half of the door forms a molding 19 outlining the window opening which is closed by the glazing 21 sliding vertically in the glass run 23 disposed against the inner face of the member 13 and passing at the belt (see Fig. 4) between the belt rail 25 and the garnish rail or regulator board 27 which are herein shown as of wooden construction.

The door shown is mounted to swing on the pintles 29 about a hinge axis inward of the exterior surface thereof as defined by the panel 17 and, in the upper portion of the body, overlapped and concealed by the flange 15 which opposes with a suitable clearance the rear exterior edge 31 of the body pillar 7, the rear face of which is recessed at 33 from this point to pass the flange 15 in the opening movement of the door.

As herein shown, the door is hung on two upper hinges aligned respectively with the top rail 35 and belt rail 25. A lower hinge 37 may be utilized. On account of the turnunder of the vehicle the axis of the pintles 29 will at the lower portion of the door fall outside the exterior face of the door. The lower hinge should be of a suitable type to permit the door to swing about this axis and I have herein shown a hinge 37 of the usual exposed type. My invention more particularly relates to the construction of hinging means in the upper portion of the body where the problem of organizing elements of desired strength within desired restricted dimensions is particularly acute.

For supporting the pintles 29 from the body pillar I herein show hinge leaves 39 of the butt type which are mortised into the rear face of the pillar and, in this case, to permit the placing of the pintles in the rear of the flanges 15 and to permit the movement of the door these leaves are provided with an offset 41 which provides for the mortising of the distal portion of the leaf forwardly from the transverse plane of the hinge axis and provides the neck portion clearly shown in Fig. 2 into which flange 15 may pass in the swinging movement of the door. Cooperating knuckles 43 are shown as disposed immediately outward of the surface of the pillar 13 and they are herein carried by straps, 45 in the case of the top hinge and 47 in the case of the middle hinge, which are anchored inwardly of the pillar, the knuckles projecting immediately in the rear of flange 15 through suitable slots in the pillar. These straps desirably, as in the embodiment shown, extend longitudinally of the body and form a part of the rails of the door.

The belt rail 25 and the top rail 35 are herein shown as separate from these straps and as of wooden construction and the straps may be of angular formation and serve as brackets or anchors for the rails. Thus, referring to Figs. 2 and 3, the member 45 for the top rail is of trihedral form embracing the exterior upper corner of the rail and is provided with the vertical flange 48 receiving the exterior face of the rail and the horizontal flange 49 overlying the top face of the rail, both these flanges being suitably secured thereto. The flanges are connected by the web 51 which may be welded or otherwise secured to the inner face of the door hinge pillar 13. The member 47 at the belt may comprise a horizontal flange 53 underlying the belt rail, a vertical flange 55 extending therefrom and secured to the outer face of the rail and web 57 connecting them and welded to the inner face of the hinge pillar 13.

The construction as described affords a very secure hanging means for the door as the strains are extended through into the framework thereof and not carried entirely by the hinge pillar 13 which, therefore, may be made correspondingly light and thin to reduce the dimension of the corner assembly. At the same time the thickness of the usual leaf is removed from the door joint, eliminating another factor requiring consideration in the design of an assembly of small dimension. When the upper hinge is used aligned with the top rail as shown, it is out of the way of the glass guide 23, and by extending member 47 of the middle hinge longitudinally of the body, it may be securely incorporated in the fabric of the door, yet lie entirely exterior to the plane of the sliding glass 21, thus permitting the glass guide to be disposed directly against the inner face of the web-like pillar 13, this construction again facilitating the production of an assembly of small dimension and permitting the available space to be utilized effectively in providing structural members of adequate size and strength.

In the present description and the accompanying claims I have attempted to use the words "interior" and "exterior" with reference to the vehicle as a whole, and the words "inner" and "outer" with reference to the door as a structure in itself.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In a vehicle a door case including a body hinge pillar, a door closing into said case having a door hinge pillar forming a door joint with said body pillar, the door having an overlap flange to cover said joint, the body hinge pillar being recessed to pass the flange in the swinging movement of the door, a hinge leaf secured to the body pillar having knuckles underlying said flange substantially in the plane of the door joint, and a leaf having cooperating knuckles, said latter leaf extending longitudinally of the vehicle into the door structure inwardly of the exterior face thereof.

2. In a vehicle a door case including a body hinge pillar, a door framed with pillars and rails closing into said case and including a door hinge pillar forming a door joint with said body pillar, the door having an overlap flange to cover the joint, the body pillar being recessed to pass the flange in the swinging movement of the door, a hinge leaf secured to the body pillar having knuckles underlying said flange substantially in the plane of the door joint, and a leaf having cooperating knuckles, said latter leaf extending lengthwise of the vehicle through the door hinge pillar and secured to a rail.

3. In a vehicle of the closed type a door case including a body hinge pillar, a framed door closing into said case and including a door hinge pillar substantially of web section forming a door joint with said body pillar, a glass run received at the interior face of said section and a belt rail exterior to the run, and means for hanging the door comprising hinge knuckles presented at the jamb face of the body pillar and an element having cooperating knuckles and a securing part which extends through the door pillar and is anchored to said belt rail wholly exterior to said glass run.

4. In a vehicle of the closed type a door case including a body hinge pillar, said pillar being cut away to pass in the swinging movement of the door the overlap flange hereinafter mentioned, a framed door closing into said case and including a door hinge pillar substantially of web section forming a door joint with said body pillar, an overlap flange to extend over said door joint, a glass run received at the interior face of said section and a belt rail exterior to the run, and means for hanging the door comprising hinge knuckles presented at the jamb face of the body pillar to underlie said flange substantially in the plane of the door joint and an element having cooperating knuckles and a securing part which extends through the door pillar and is anchored to said belt rail wholly exterior to said glass run.

5. In a vehicle a door case including a body hinge pillar, a door closing into said case having a door hinge pillar substantially of web section forming a door joint with said body pillar, the door having an overlap flange to cover said joint, the body hinge pillar being recessed to pass the flange in the swinging movement of the door, means for hanging the door from the body pillar to turn about an axis interior of said flange at least in the upper portion of the door comprising hinge knuckles carried by the body pillar and presented interiorly of said flange and a strap secured at the inner face of the door pillar and having cooperating knuckles projecting therethrough to the outer side thereof.

6. A vehicle door framed with pillars and rails and including a hinge pillar substantially of web section and having a slot, a strap secured to a rail and having hinge knuckles projecting through the slot and presented at the outer face of the pillar.

7. A vehicle door framed with pillars and rails and including a hinge pillar substantially of web section and having a slot, an angular member having legs secured to hinge pillar and a rail respectively and having terminal hinge knuckles projecting through the slot.

8. A vehicle door framed with pillars and rails and including a hinge pillar substantially of web section and having a slot, a trihedral anchor embracing a rail and secured to said hinge pillar and having terminal hinge knuckles projecting through the slot.

9. A vehicle door framed with pillars and rails including a hinge pillar of substantially web section and having an overlap flange, said web section having a slot, hinge knuckles carried by a rail and projecting through the slot to lie outward of said pillar and interiorly of said rail substantially in the door joint.

In testimony whereof, I have signed my name to this specification.

FREDERICK J. KUBLER.